(12) United States Patent
Berger et al.

(10) Patent No.: US 8,327,078 B2
(45) Date of Patent: Dec. 4, 2012

(54) DYNAMIC TRAILING EDGE LATENCY ABSORPTION FOR FETCH DATA FORWARDED FROM A SHARED DATA/CONTROL INTERFACE

(75) Inventors: Deanna Postles Dunn Berger, S Hyde Park, NY (US); Michael Fee, Cold Spring, NY (US); Arthur J. O'Neill, Jr., Poughkeepsie, NY (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/822,884

(22) Filed: Jun. 24, 2010

(65) Prior Publication Data
US 2011/0320721 A1    Dec. 29, 2011

(51) Int. Cl.
G06F 12/00 (2006.01)
(52) U.S. Cl. ........................................ 711/138
(58) Field of Classification Search .................... 711/138
See application file for complete search history.

(56) References Cited

U.S. PATENT DOCUMENTS

| | | | |
|---|---|---|---|
| 6,356,980 B1 | 3/2002 | Arimilli et al. | |
| 6,643,745 B1 | 11/2003 | Palanca et al. | |
| 6,957,305 B2 | 10/2005 | Ray et al. | |
| 7,865,669 B2 * | 1/2011 | Kornegay et al. | 711/138 |
| 7,890,699 B2 * | 2/2011 | Comparan et al. | 711/122 |
| 2006/0112233 A1 * | 5/2006 | Hu et al. | 711/138 |
| 2009/0037664 A1 * | 2/2009 | Kornegay et al. | 711/138 |
| 2009/0182944 A1 * | 7/2009 | Comparan et al. | 711/122 |

* cited by examiner

Primary Examiner — John Lane
(74) Attorney, Agent, or Firm — Cantor Colburn LLP; John Campbell

(57) ABSTRACT

A computer-implemented method for managing data transfer in a multi-level memory hierarchy that includes receiving a fetch request for allocation of data in a higher level memory, determining whether a data bus between the higher level memory and a lower level memory is available, bypassing an intervening memory between the higher level memory and the lower level memory when it is determined that the data bus is available, and transferring the requested data directly from the higher level memory to the lower level memory.

15 Claims, 6 Drawing Sheets

DYNAMIC TRAILING EDGE LATENCY ABSORPTION FOR FETCH DATA FORWARDED FROM A SHARED DATA/CONTROL INTERFACE

BACKGROUND

The present invention relates to improved data processing method, and more specifically, to method for managing data flow within a multi-level memory hierarchy of a computer system and preventing trailing edge latency for fetch data forwarded from a shared data/control interface.

In a computer system, the processor (CPU) executes instructions of a program. Typically, execution of instructions involves fetching (e.g., loading) and reading data into registers from memory (e.g., a cache), performing operations on the data, and storing and writing the results of the operations to memory, for example. Sometimes there may be upstream interface bottlenecks that increase target fetch data latency within a computer system. These upstream interface bottlenecks are caused by data stream interruptions and/or smaller upstream interface bandwidth which affect latency over the final high bandwidth uninterruptible data interface (e.g., L3 cache to L2 cache interface). A current method involves accumulating data in a buffer until all data is received and then returning the entire line over the L3 to L2 interface with no gaps. This method directly affects the latency of the L2 cache receipt of the target data. Another method allows gaps on the final L3 to L2 interface thereby solving the latency problem for the target data, however, it fails to eliminate a trailing edge penalty or prevent other fetches from being delayed due to the unavailability of the data bus.

SUMMARY

According to an embodiment of the present invention, a computer-implemented method for managing data transfer in a multi-level memory hierarchy is provided. The method includes receiving a fetch request for allocation of data in a higher level memory, determining whether a data bus between the higher level memory and a lower level memory is available, bypassing an intervening memory between the higher level memory and the lower level memory when it is determined that the data bus is available, and transferring the requested data directly from the higher level memory to the lower level memory.

A computer-program product and a multi-level memory hierarchy in a computer system for performing the above-mentioned method are also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention disclose a method of directly bypassing data directly from an upper level cache onto a lower level cache interface, without the use of a data buffer.

Figure 1:
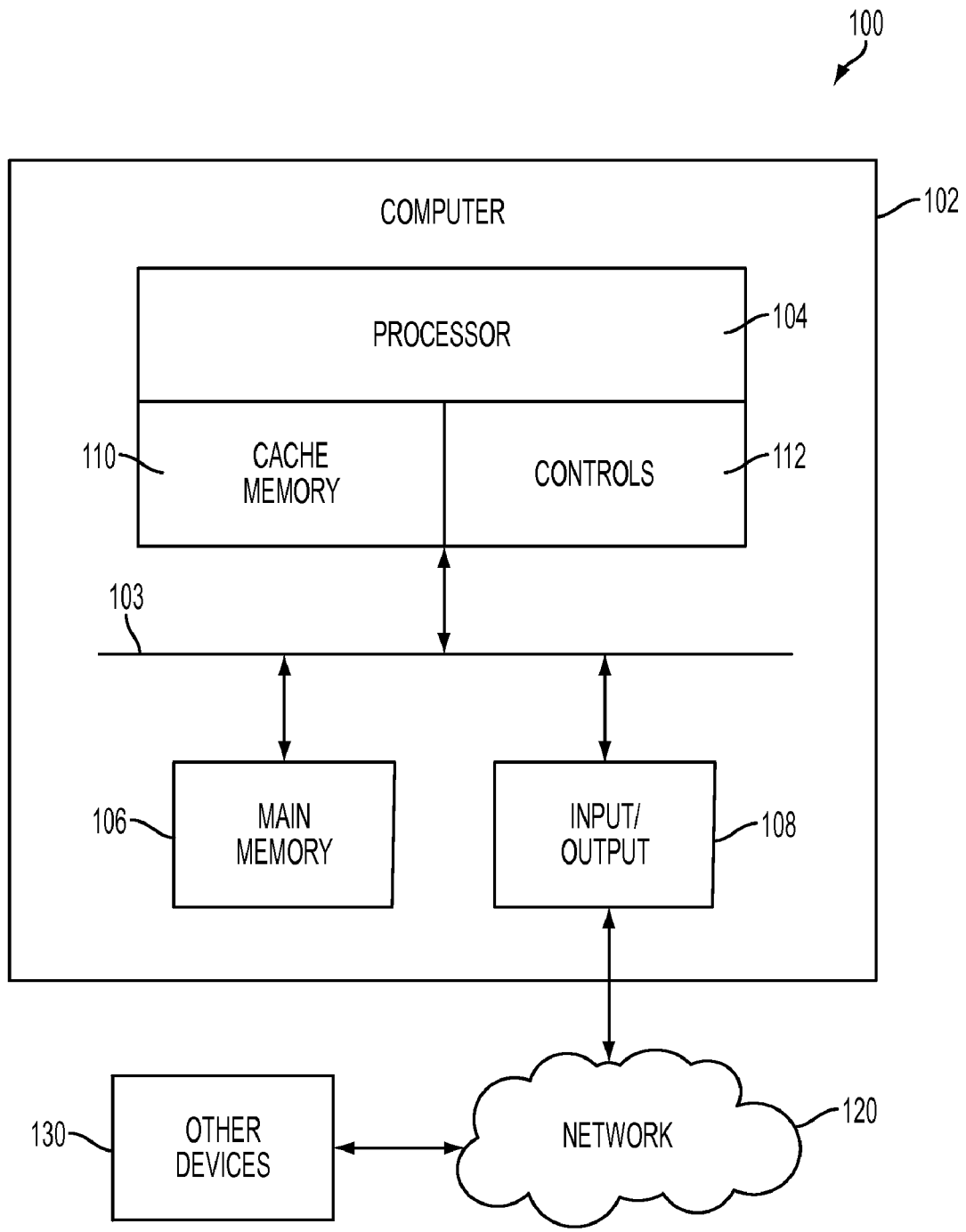
FIG. 1 is an example of a computer system configured for data processing that may be implemented within embodiments of the present invention.
Figure 2:
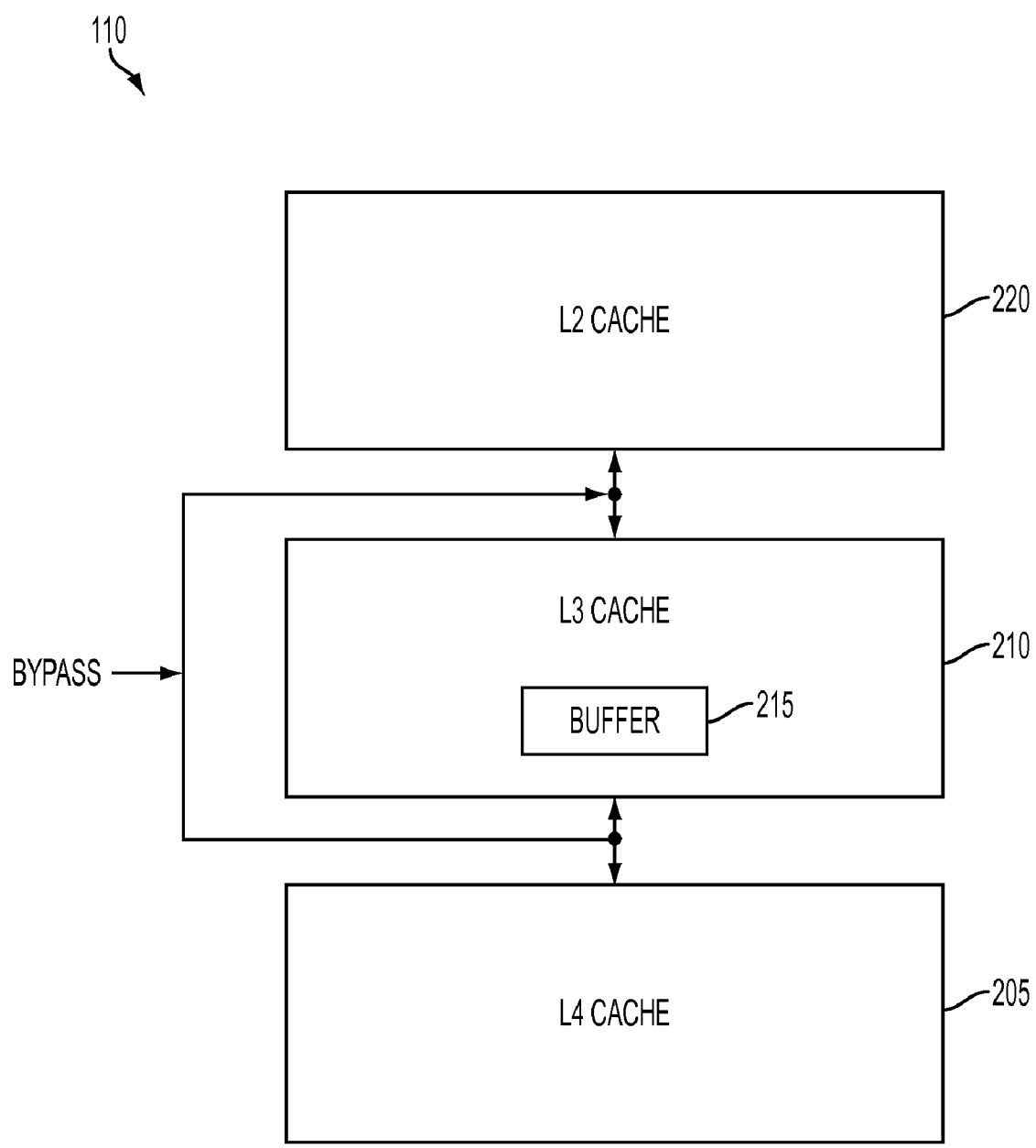
FIG. 2 is a block diagram illustrating a multi-level memory hierarchy of the cache shown in FIG. 1 that may be implemented within embodiments of the present invention.

FIG. 1 is an example of a computer system configured for data processing that may be implemented within embodiments of the present invention. The computer system 100 includes a computer 102, a network 120 and other components 130. The computer 102 and other components 130 are in communication with each other via the network 120. The computer 102 includes a processor 104, main memory 106, and input/output components 108 which are in communication via a bus 103. Processor 104 includes cache memory 110 and controls 112, which include components configured for data processing as described in the flowchart shown in FIG. 3. The cache 110 includes multiple levels that are on or off-chip from processor 104 as depicted in FIG. 2 described below. Memory 106 may include various data stored therein, e.g., instructions, software, routines, etc., which may be transferred to/from the cache 110 by controls 112 for execution by the processor 104. Input/output components 108 may include one or more components that facilitate local and/or remote input/output operations to/from computer 102 such as a display, keyboard, modem, network adapter, etc. (not depicted).

FIG. 2 is a block diagram illustrating the multi-level memory hierarchy of the computer system shown in FIG. 1. As shown in FIG. 2, according to an embodiment of the present invention, the cache 110 includes a higher level memory (e.g., an L4 cache) 205, an intervening memory (e.g., an L3 cache) 210 including a data buffer 215 and a lower level memory (e.g., L2 cache) 220. The present invention discloses a method of bypassing the intervening memory 210 when an interface to L2 cache 220 is available and bypassing the data buffer 215 when data stream interruptions occur. Additional details regarding this method will now be described below while referencing FIGS. 3 and 4.

Figure 3:
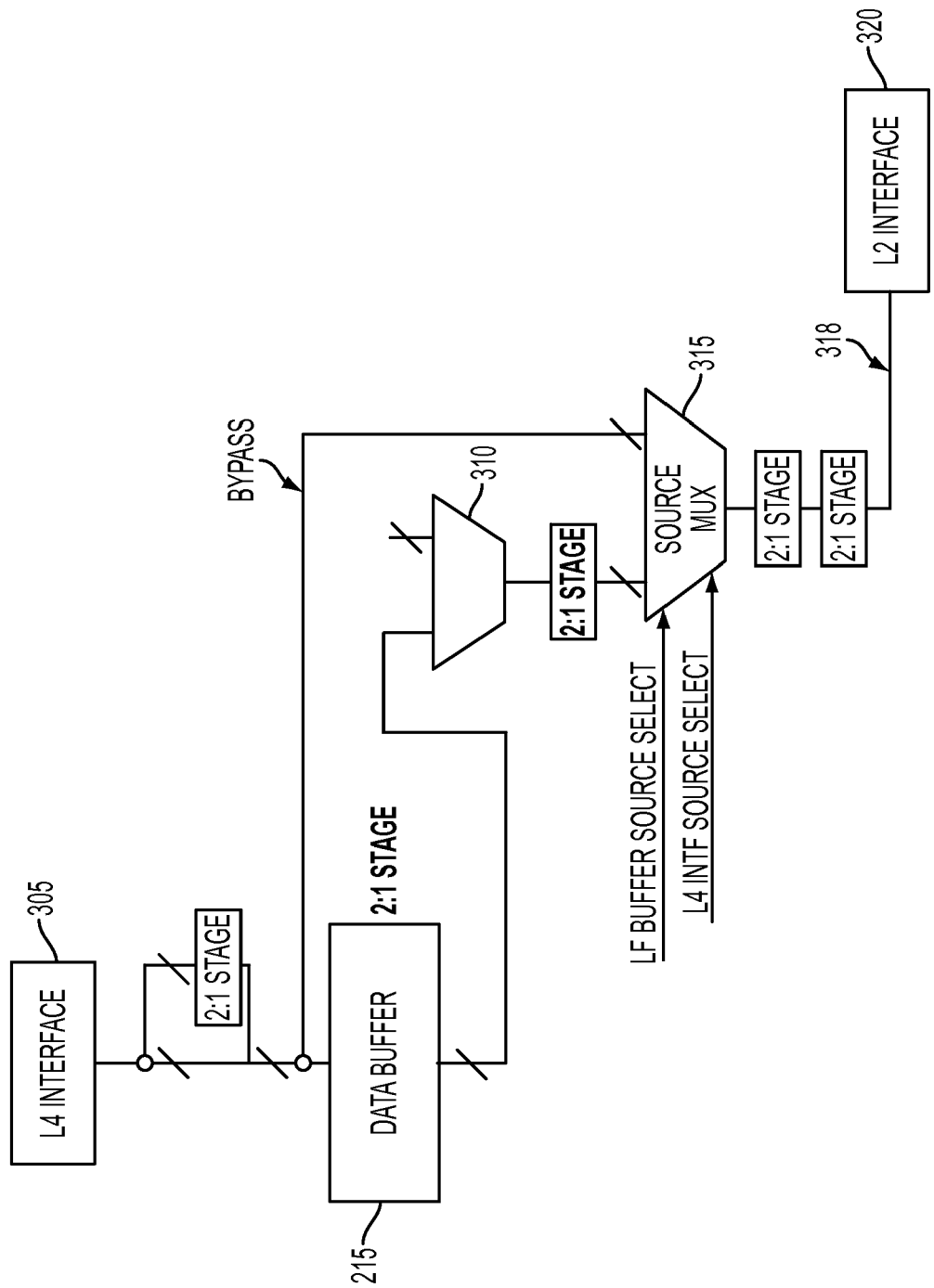
FIG. 3 is a block diagram illustrating a data process flow between a higher level memory interface and a lower level memory interface within a multi-level memory hierarchy of a computer system that can be implemented within embodiments of the present invention.

FIG. 3 is a block diagram illustrating a data process flow between a higher level memory interface and a lower level memory interface within a multi-level memory hierarchy of a computer system that can be implemented within embodiments of the present invention.

As shown in FIG. 3, upon receiving a fetch request from a processor (as depicted in FIG. 1, for example), when the requested data is available, an interface 305 at the higher level memory 205 of the multi-level memory hierarchy transfers the requested data at a rate of 2:1, for example. The requested data bypasses the intervening memory 210 and its associated data buffer 215 and is directly transferred through a multiplexer 315 to an interface 320 at the lower level memory 220. If the interface 320 at the lower level memory 220 is busy with another data transfer or data interruptions via a data bus 318, the requested data from the higher level memory 205 is transferred via the L4 interface 305 to the data buffer 215 at the intervening memory 210 until the interface 320 is free. As further shown in FIG. 3, the requested data is then transferred through a first multiplexer 310 to the multiplexer 315 (i.e., the second multiplexer) and onto the interface 320 of the lower level memory 220. Once the data transfer from the data buffer 215 at the intervening memory 210 to the L2 interface 320 has begun, the intervening memory 210 controls can dynamically change the select lines to the multiplexer 315 such that the remaining beats of the data transfer are returned on the bypass path directly transferred through the multiplexer 315 to the interface 320 at the lower level memory 220.

Figure 4:
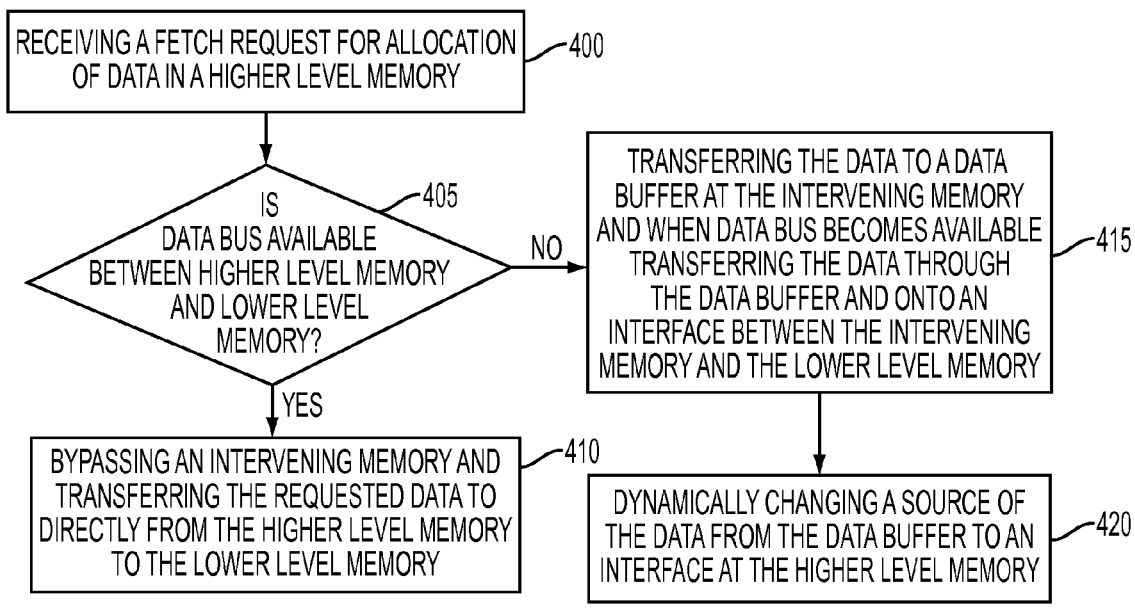
FIG. 4 is a flowchart illustrating a computer-implemented method for managing data flow within a multi-level memory hierarchy of a computer system that can be implemented within embodiments of the present invention.

FIG. 4 is a flowchart illustrating a computer-implemented method for managing data flow within a multi-level memory hierarchy of a computer system that can be implemented within embodiments of the present invention. As shown in FIG. 4, the process begins at operation 400 where a fetch request is received for allocation of data in a higher level memory. From operation 400, the process continues to operation 405 where it is determined whether the data bus (element 318 depicted in FIG. 3) from the intervening memory 210 to the requesting L2 interface 320 is available. If it is determined that the requested data bus 318 is available, the process continues to 410 where an intervening memory is bypassed and the requested data is transferred directly from the higher level memory to a lower level memory. On the other hand, if it is determined at operation 405, that the requested data bus 318 is not available, the process moves to operation 415 where the data is transferred into a data buffer 215 at the intervening memory 210, and once the data bus 318 becomes available data is transferred through the data buffer 215 onto the interface 320 between the intervening memory and the lower level memory 320. The read of the data buffer 215 will likely begin to occur before the write has completed. Next, at operation 420, a source of data is dynamically changed from the data buffer 215 to the higher level memory interface 305 when an interruption occurs at an interface 305 between the higher level memory and the intervening memory. According to an embodiment of the present invention, the interface 305 between the higher level memory and the intervening memory (e.g., the L4 to L3 interface) does not contain separate data and control busses therefore the data may sometimes be interrupted to allow controls to be sent. Timing diagrams to further described data flow in FIG. 3 and the operations of FIG. 4 will now be described below while referencing FIGS. 5 and 6.

Figure 5:
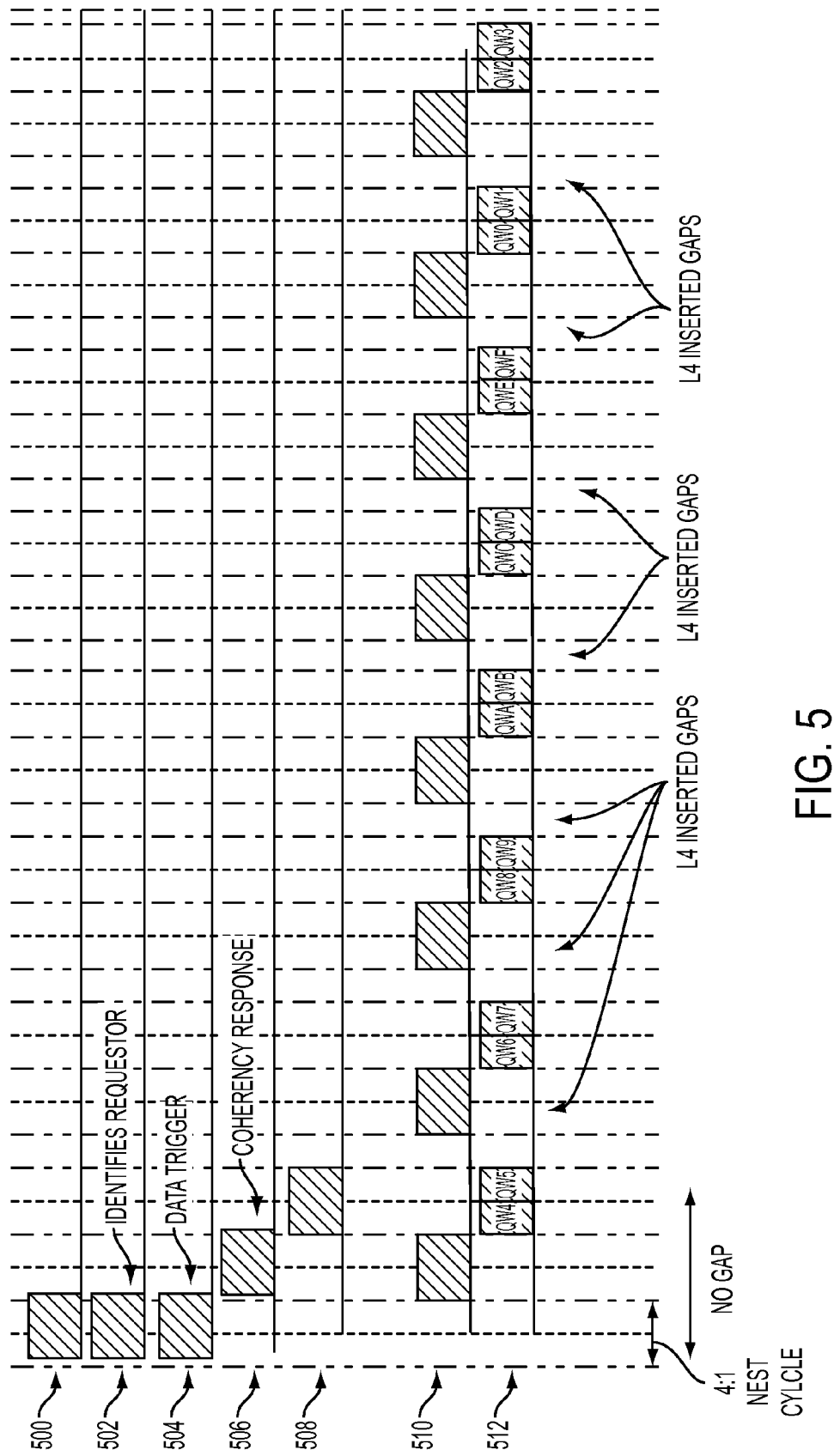
FIG. 5 is timing diagram illustrating an example of a fetch data response according to an embodiment of the present invention.

FIG. 5 is timing diagram illustrating an example of a fetch data response according to an embodiment of the present invention. Specifically, FIG. 5 is a timing diagram of the bypassing operation performed in operation 410 of FIG. 4. FIG. 5 illustrates the timing of the interface between the intervening memory and the lower level memory. As shown in FIG. 5, at line 500, the fetch request is generated. The signals modeled by line 502 identify the requestor within the lower level memory 220 that is waiting for the data. At line 504, the requested data is triggered and a coherency response is generated at line 506. Line 508 provides additional information required to be sent with the response. Line 510 shows the data valid signals that according to the protocol of the interface in our embodiment, must proceed the actual data signal by two 2:1 (or one 4:1) cycles. These data valid signals are required to let the lower level memory 220 receiver know whether data is being sent over the interface or if a gap is being transferred over the interface 305 from the higher level memory 205. Interface protocol further requires that no gaps be presented between the fetch request data trigger 204 and the first octword of data shown on line 512. According to an embodiment of the present invention, subsequent gaps in the data transfer may or may not occur.

Figure 6:
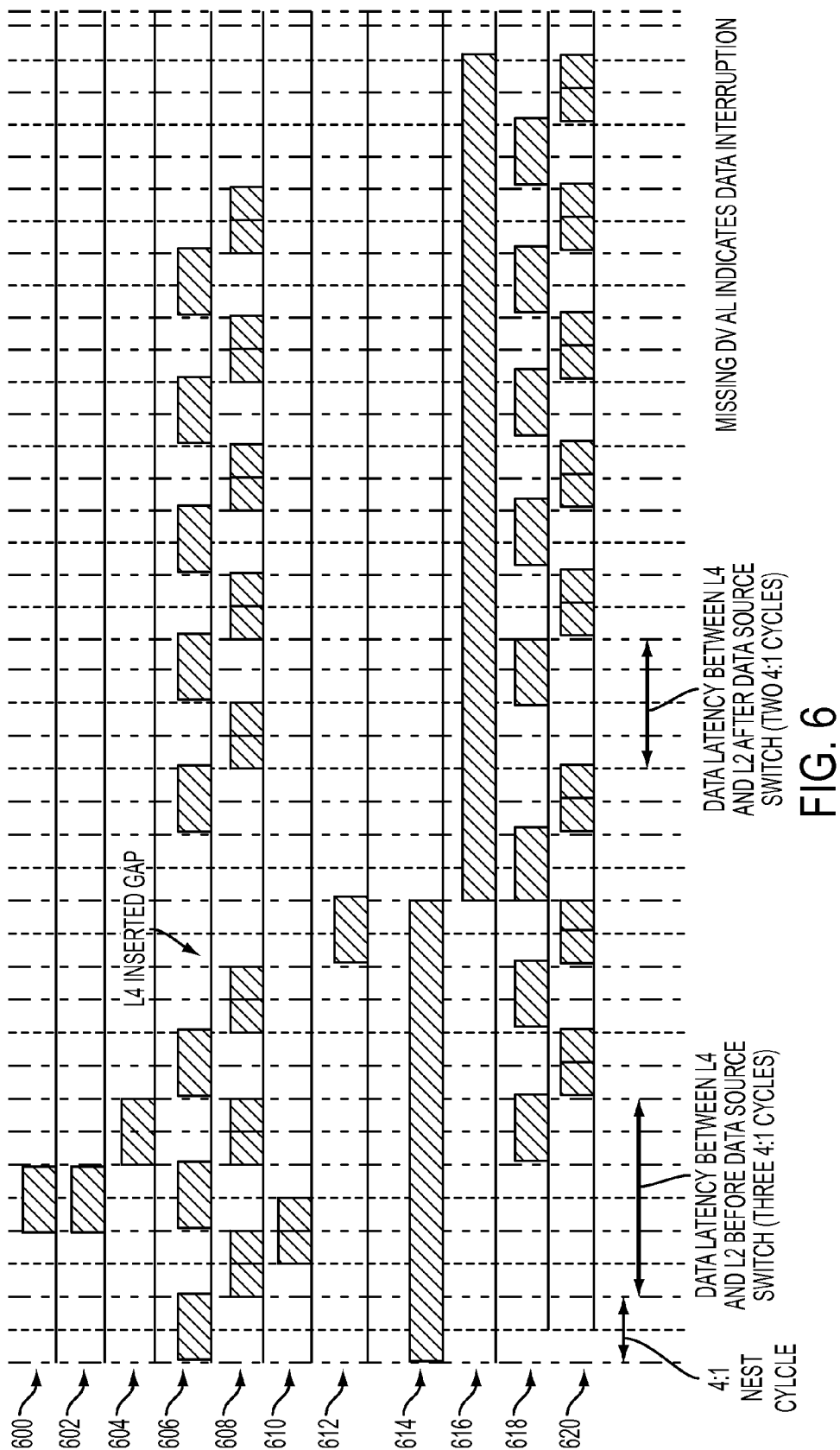
FIG. 6 is timing diagram illustrating another example of a fetch data response that can be implemented within alternative embodiments of the present invention.

FIG. 6 is timing diagram illustrating another example of a fetch data response that can be implemented within alternative embodiments of the present invention. FIG. 6 illustrates the case where an immediate bypass from the higher level memory interface 305 to the lower level memory interface 320 is not possible. As shown in FIG. 6, at line 606, the data valids from the higher level memory interface 305 are shown. On this higher level memory interface 305, the data itself follows the data valids by one 4:1 cycle, showed by line 608 in FIG. 6. Because the interface 320 is not available, data will be routed to the data buffer 215. Therefore, the L3 cache 210 control logic marks the data source of the response over the final lower level memory interface 320 as the data buffer 215 by asserting the signal represented by line 614 of FIG. 6. In this example, two 4:1 cycles later, the lower level memory interface 320 becomes available causing the response request to be generated, as shown by line 600. At line 602, the requested data is triggered and a coherency response is generated at line 604. Line 618 shows the data valid signals for the lower level memory interface 320. Line 620 shows the data for the lower level memory interface 320 following the data valid 618 by one 4:1 cycle. Next, on line 606 there are three data valids, followed by a gap of one 4:1 cycle indicating that the contents of the interface in the next cycle will not be data for the ongoing transfer, but will be control data for another request. The L3 cache 210 control logic is monitoring the data stream for a gap to occur. When it detects a missing data valid 606 in the middle of an ongoing transfer of data from the higher level memory interface 305, it recognizes this as a "data stall" condition 612. The detection of the data stall triggers the L3 cache 210 controller to change the data source from the buffer 215 to the higher level memory interface 305. This is done by resetting buffer source signal represented by line 614 of FIG. 6 and asserting the signal represented by line 616 of FIG. 6, which is used to indicate that the source of the data stream is now the higher level memory interface 305 itself, thereby routing the remaining data around the data buffer 215 directly from the higher level memory interface 305 to the lower level memory interface 320. As a result of this data source switching the next data valid 618 and subsequent data beat 620 that appears on the lower level memory interface 320 is a full 4:1 cycle earlier than it would have been had the source not been switched. This latency savings continues for each remaining beat in the data transfer.

According to embodiments of the present invention, interruptions are detected and a plurality of data valids for lower level memory may be blocked; and a count of the plurality of data valids may be maintained in order to detect whether the transfer of the data requested has been completed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The flowcharts can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for managing data transfer in a multi-level memory hierarchy, the method comprising:
    receiving a fetch request for allocation of data in a higher level memory;
    determining whether a data bus between the higher level memory and a lower level memory is available;
    bypassing an intervening memory between the higher level memory and the lower level memory when it is determined that the data bus is available; and
    transferring the requested data directly from the higher level memory to the lower level memory.

2. The computer-implemented method of claim 1, wherein determining whether the data bus is available comprises:
    transferring the data to a data buffer at the intervening memory when the data bus is unavailable and when the data bus becomes available transferring the data through the data buffer onto an interface between the intervening memory and the lower level memory; and
    dynamically changing a source of the data from the data buffer to an interface at the higher level memory.

3. The computer-implemented method of claim 2, wherein the data requested in the higher level memory is located off-chip and is routed through the data buffer to the lower memory level.

4. The computer-implemented method of claim 3, further comprising:
    detecting any interruptions and blocking a plurality of data valids for lower level memory; and
    maintaining a count of the plurality of data valids to detect whether the transfer of the data requested has been completed.

5. The computer-implemented method of claim 2, further comprising:
    reading data from the lower level memory while transferring data from the intervening memory; and
    setting the data buffer as the source of the data.

6. A computer-program product comprising a tangible storage medium readable by a processing circuit and storing instructions for execution by the processing circuit for performing a method for managing data transfer in a multi-level memory hierarchy, the method comprising:
    receiving a fetch request for allocation of data in a higher level memory;
    determining whether a data bus between the higher level memory and a lower level memory is available; and
    bypassing an intervening memory between the higher level memory and the lower level memory when it is determined that the data bus is available; and
    transferring the requested data directly from the higher level memory to the lower level memory.

7. The computer-program product of claim 6, wherein determining whether the data requested is available comprises:
    transferring the data to a data buffer at the intervening memory when the data bus is unavailable and when the data bus becomes available transferring the data through the data buffer onto an interface between the intervening memory and the lower level memory; and
    dynamically changing a source of the data from the data buffer to an interface at the higher level memory.

8. The computer-program product of claim 6, wherein the data requested in the higher level memory is located off-chip and is routed through the data buffer to the lower memory level.

9. The computer-program product of claim 6, wherein the method further comprises:
    detecting any interruptions and blocking a plurality of data valids for lower level memory; and
    maintaining a count of the plurality of data valids to detect whether the transfer of the data requested has been completed.

10. The computer-program product of claim 6, wherein the method further comprises:
    reading data from the lower level memory while transferring data from the intervening memory; and
    setting the data buffer as the source of the data.

11. A multi-level memory hierarchy in a computer system comprising:
    a higher level memory;
    a lower level memory;
    an intervening memory between the higher level memory and the lower level memory and comprising a data buffer; and a processor; and a controller configured to:

send a fetch request for allocation of data in a higher level memory;

determine whether a data bus between the higher level memory and the lower level memory is available; and bypass the intervening memory when it is determined that the data bus is available; and transfer the requested data directly from the higher level memory to the lower level memory.

12. The multi-level memory hierarchy of claim 11, wherein the controller is further configured to:

transfer the data to the data buffer at the intervening memory when the data bus is unavailable and when the data bus becomes available transfer the data through the data buffer onto an interface between the intervening memory and the lower level memory; and dynamically change a source of the data from the data buffer to an interface at the higher level memory.

13. The multi-level memory hierarchy of claim 11, wherein the data requested in the higher level memory is located off-chip and is routed through the data buffer to the lower memory level.

14. The multi-level memory hierarchy of claim 11, wherein the controller is further configured to:

detect any interruptions and blocking a plurality of data valids for lower level memory; and maintain a count of the plurality of data valids to detect whether the transfer of the data requested has been completed.

15. The multi-level memory hierarchy of claim 11, wherein the controller is configured to:

read data from the lower level memory while data is being transferred from the intervening memory; and set the data buffer as the source of the data.

* * * * *